(12) United States Patent  (10) Patent No.: US 9,061,808 B2
Echauz  (45) Date of Patent: Jun. 23, 2015

(54) PROTECTIVE BAG FOR LARGE OBJECTS

(71) Applicant: John B. Echauz, Makati (PH)

(72) Inventor: John B. Echauz, Makati (PH)

( * ) Notice: Subject to any disclaimer, the term of this patent is extended or adjusted under 35 U.S.C. 154(b) by 0 days.

(21) Appl. No.: 13/747,058

(22) Filed: Jan. 22, 2013

(65) Prior Publication Data

US 2013/0312882 A1  Nov. 28, 2013

(30) Foreign Application Priority Data

May 24, 2012  (PH) .............................. 1-2012-000127

(51) Int. Cl.
| | |
|---|---|
| *B60J 11/04* | (2006.01) |
| *B65D 65/22* | (2006.01) |
| *B65D 33/24* | (2006.01) |
| *B65D 85/68* | (2006.01) |
| *B65D 88/16* | (2006.01) |
| *B65D 90/06* | (2006.01) |

(52) U.S. Cl.
CPC .................. *B65D 65/22* (2013.01); *B60J 11/04* (2013.01); *B65D 33/24* (2013.01); *B65D 85/68* (2013.01); *B65D 2313/02* (2013.01); *B65D 2585/6867* (2013.01); *B65D 88/16* (2013.01); *B65D 90/06* (2013.01)

(58) Field of Classification Search
CPC .................................. B65D 65/22; B60J 11/04
USPC ........... 150/166; 206/335; 296/136.01, 136.1, 296/136.02, 95.1, 136.04; 280/770; 383/33, 383/35, 61.3, 95, 97, 41; 224/901, 901.6
See application file for complete search history.

(56) References Cited

U.S. PATENT DOCUMENTS

| | | | | |
|---|---|---|---|---|
| 2,128,689 | A * | 4/1938 | Bingham | 383/41 |
| 2,311,514 | A * | 2/1943 | Bramblett | 150/166 |
| 2,366,600 | A * | 1/1945 | Daniel | 135/87 |
| 2,430,763 | A * | 11/1947 | Foster | 383/22 |
| 3,474,803 | A * | 10/1969 | Davis | 135/124 |
| 4,811,768 | A * | 3/1989 | Williams | 150/102 |
| 4,930,557 | A * | 6/1990 | Lohse | 150/166 |
| 5,071,003 | A * | 12/1991 | Freelander | 206/282 |
| 5,755,366 | A * | 5/1998 | Mazzo | 224/222 |
| 6,093,466 | A * | 7/2000 | Steinke et al. | 428/40.1 |
| 6,257,470 | B1 * | 7/2001 | Schaefer | 224/318 |
| 6,273,113 | B1 * | 8/2001 | Streyckmans | 135/88.13 |
| 6,517,141 | B1 * | 2/2003 | Su | 296/136.1 |
| 7,458,630 | B1 * | 12/2008 | Marciano et al. | 296/136.01 |
| 2006/0118016 | A1 * | 6/2006 | Patterson | 112/153 |
| 2006/0225822 | A1 * | 10/2006 | Chen | 150/166 |

* cited by examiner

*Primary Examiner* — Sue A Weaver

(74) *Attorney, Agent, or Firm* — Birch, Stewart, Kolasch & Birch, LLP

(57) ABSTRACT

An openable/closable water-proof bag into which a motor vehicle, or other large object, may conveniently be moved and placed inside. The bag is formed of two sheets polyethylene plastic material, one atop the other, which are bonded and adhered at one end and on two vertical sides, leaving one end of the bag that is openable and closable. When the openable and closable end of the bag is closed, and the sides of the bag are folded upwardly and secured tightly around surfaces of the motor vehicle or other large object, the contents of the bag are protected from water and other harmful outside elements, thereby preserving intact electrical and mechanical components of the enclosed object from the effects of a flood and outside debris.

15 Claims, 9 Drawing Sheets

PROTECTIVE BAG FOR LARGE OBJECTS

CROSS-REFERENCE TO RELATED APPLICATION

The present application claims priority under 35 U.S.C. §119 to Philippine Patent Application No. 1-2012-000127, filed May 24, 2012. The entire contents of the above-identified application are hereby incorporated by reference.

BACKGROUND OF THE INVENTION

1. Field of the Invention

The present invention relates two layers of a heavy-duty, polyethylene plastic material, with one layer atop the other, and each layer having two vertical sides and two horizontal sides. One horizontal end and two vertical sides of each of the two layers are adhered to each other to form a bag (sack) with the other horizontal side being, into which a motor vehicle, or other large objects, may be conveniently be moved and placed inside. The open end of the bag is closed, and the sides of the bag are folded upwardly and secured tightly around surfaces of the motor vehicle or other large object in the bag. Two or more straps are provided on the outside of the bag to tightly secure the bag against its contents, and to secure the bag to a structure adjacent to the bag in order prevent the bag from being moved. The bag protects the enclosed objects from water, debris and other harmful outside elements, thereby preserving the integrity of the electrical, electronic or mechanical components of the enclosed objects.

2. Description of Background Art

Many areas of the world experience heavy rain, hurricanes, and typhoons annually which cause severe floods. As these forces of nature consequently result in damage in inundated areas, it likewise results in damages to personal and business property, such as motor vehicles, as they are often left unprotected against it. More often than not, the damage caused to these motor vehicles is beyond repair, thereby creating a great loss.

Attempts to address the challenge of protecting motor vehicles and other large object in the past have been minimal and insufficient.

For example, http://totallyabsurd.com/floodbag.htm describes a Flood Bag, which appears to be a simple plastic bag gathered at the top with a knot.

In Thailand, during the October to December 2011 flooding event, vehicles were stored in large, make-shift plastic bags, as shown at https://www.facebook.com/WaterAwayCapsule.

In the U.S., there is a conventional bag used to store personal belongings during floods, as described at http://landshutters.com/flood-bags.

Disadvantages of these conventional products include:
Difficulty of driving a vehicle into a large plastic bag,
Many plastic materials are easily damaged,
A simple knot is used to seal the mouth of the plastic bag,
Bag and contents may float if flood waters rise; there is no design to keep the bags and contents from floating away.

Needed to address these problems, is a strong, inexpensive, and insulated covering or casing for protecting the motor vehicle or other large object in a stationary position. The covering must be water resistant and puncture resistant to protect the vehicle, or other object, from external inundation from the heavy rains and flood, and free from leakage and/or seepage from the rain and from outside debris. In addition, there should be provision for harnessing the enclosed object so that it will not float away or cause further damage to the object during floods or water runoff.

SUMMARY AND OBJECTS OF THE INVENTION

According to an embodiment of the present invention, water proof bag for protecting objects, includes a first sheet of waterproof material having at least four sides, including two vertical sides and two horizontal sides; a second sheet of waterproof material with a size and shape similar to that of the first sheet and arranged on top of the first sheet so that sides of the second sheet are aligned above the sides of the first sheet; and a first binding member permanently sealing each pair of the vertical sides of the sheets together, and sealing one pair of the horizontal sides the first and second sheets together, thereby forming a bag having two permanently closed vertical sides, one permanently closed horizontal end, and the other horizontal side which is an openable/closable, thereby forming an openable/closable end of the bag.

In addition, a cut is formed in the second sheet which starts from a central point in along the openable/closable end and extends parallel to the vertical sides of the bag to a point 60-90% of a distance toward the closed horizontal end of the bag, the cut enabling portions of the second sheet on opposites edges of the cut to be folded away from each other and enlarging an opening at the openable/closable end of the bag, so that the objects to the protected are able to be easily entered into and position inside the bag; an attaching/detaching member for opening and closing the opposite edges of the cut in the second sheet, and a second binding member for opening and closing the opening between the pair sheets at the openable/closable end of the bag, When the wherein when the opposite edges of the cut in the second sheet are closed with the attaching/detaching member, and the opening between the pair of sheets at the openable/closable end of the bag are closed by the second binder member, the waterproof bag is closed and impervious to entry of water. Alternatively, when the opposite edges of the cut in the second sheet are separated by the attaching/detaching member, and the opening between the pair of sheets at the openable/closable end of the bag are opened by separating upper and lower panels of the second binder member, the waterproof bag is open, thereby enabling the objects in the bag to be removed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
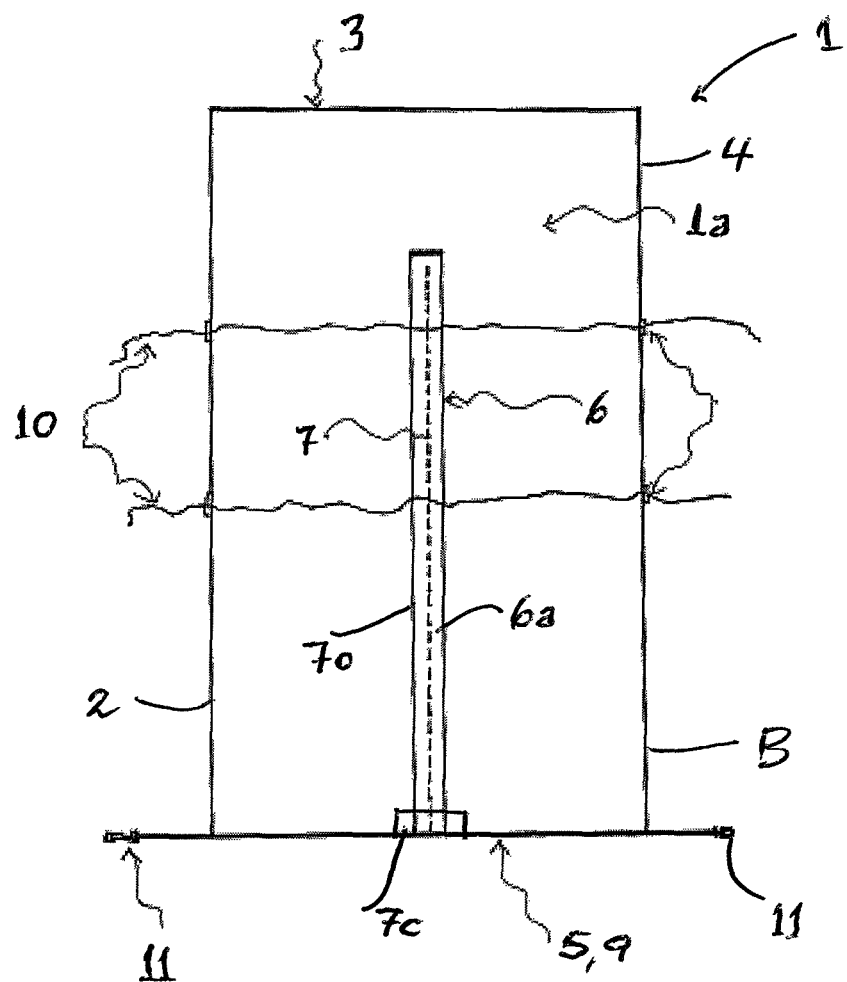
FIG. 1 is a schematic view of an embodiment of the present invention showing a closed protective bag of the present invention lying on a planar surface and viewed from the top.

The present invention, as shown in FIG. 1 in its schematic view, is a protective bag 1 lying on a planar surface and made of a heavy-duty plastic or other waterproof material for enclosing an entire motor vehicle or other large object inside. The heavy-duty plastic is made of polyethylene material with 150-350 microns (μ) thickness. The protective bag 1 is composed of two layers 1a, 1b of heavy-duty plastic, one atop of the other, with dimensions of 3.5-6.0 meters in width and 6.0-10.0 meters in length. Each of the two layers 1a, 1b may be made of a single piece of material or more than one piece of material. In addition, one or more of the two layers may be insulated.

Four sides 2-5 of the protective bag 1 include two vertical sides 2 and 4 and one closed end side 3 which are aligned, hot-sealed and further enclosed with a 3 cm. wide colored nylon piping B sewn around the three sides 2-4, creating a 'sack-like' casing, leaving an open end side 5 (a fourth side) which is not hot-sealed, with an opening 9 which is 3.5-6.0 meters in width, open where the motor vehicle can drive through, or through which other objects can be placed. Piping B provided along the lengths of the of the bag 1 two vertical sides 2 and 4 and one closed end side 3 in order to provide extra strength to each of the closed sided of the bag 1. The piping B provides extra strength and durability to the plastic bag to carry the weight of the object inside, and ability of the bag to safeguard the object from flood water and debris.

The top layer 1a of material of the protective bag 1 is cut in the middle from the openable and closable end side 5 (fourth side), creating an opening 6 of 4.7-8.0 meters in length to facilitate the placement of a motor vehicle into the bag 1. The edges 6a, 6b of the opening 6 formed by the cut are capable of being attached together with a 5 cm wide attaching/detaching member 7 with 10 cm wide plastic (in polyethylene) overlap 7o appearing at the edges 6a,6b of the opening 6, to repel water from entering through. The opening 6 on the top layer 1a of material can be closed, from one end to the other, using the heavy-duty attaching/detaching member 7 (a zipper, Velcro®, for example) once the motor vehicle or other large objects are placed inside the bag 1. The attaching/detaching member 7 is closed once the motor vehicle or large object is placed inside the bag.

The second binding member is a pair of 5 cm wide, heavy-duty and waterproof Velcro® removable adhesive panels 8a, 8b which are sewn to the heavy-duty plastic of the upper layer 1a and to the lower layer 1b at opposite sides of the opening 9 found at the open end side 5 of the protective bag 1. These adhesive panels 8a, 8b are can completely close the open end 5 of the bag by sealing upper layer 1a and the lower layer 1b at the open end side 5, and alternatively, can be separated from each other to completely open end side 5 of the bag 1. The second binding member may also be a pair of zippers or similar binding devices that are openable/closable. A heavy-duty metal-casted hook 11 is attached at the end of each of the Velcro® panels 8a, 8b, extending beyond each of the vertical sides 2, 4 of the bag 1.

Two or more nylon ropes or/straps 10 are arranged laterally across the top layer 1a of the protective bag 1. To secure the ropes (straps) 10 in place, the central portions of the ropes (straps) 10 are secured by loops 10a made of nylon material sewn in the heavy-duty plastic on each vertical side 2, 4 of the top layer 1a of material.

The protective bag, when folded is in 92 cm×82 cm×12 cm in dimension, with an approximate weight of 15-30 kgs, preferably 20 kgs.

Figure 2:
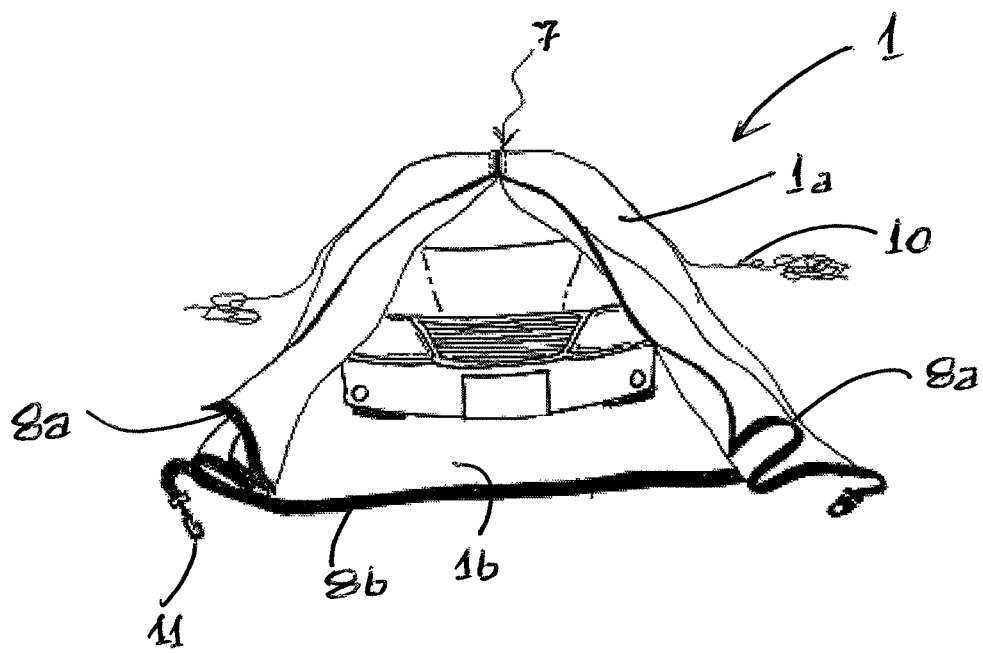
FIG. 2 is a schematic view of an embodiment of the present invention showing the opening of the protective bag with a motor vehicle driven inside.
Figure 3:
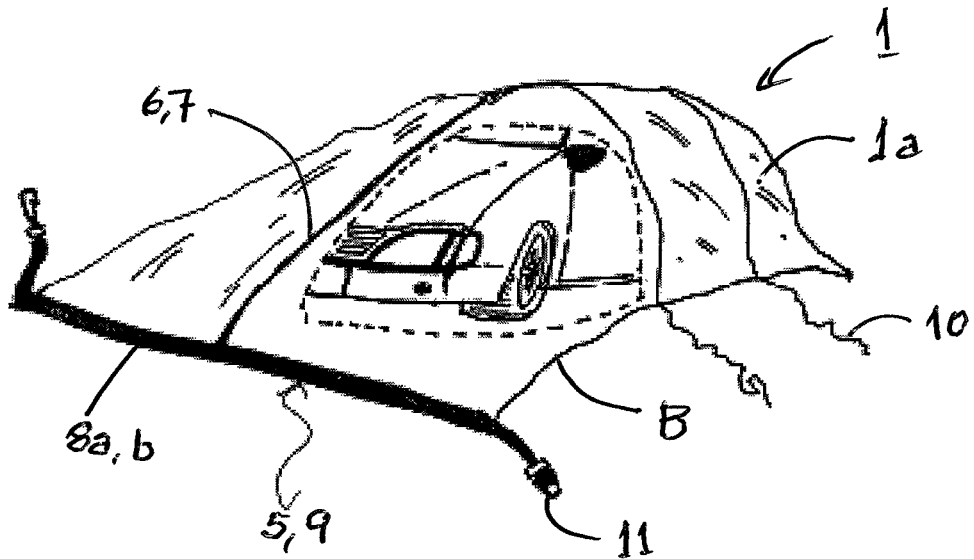
FIG. 3 is a schematic view of an embodiment of the present invention showing a closed protective bag covering a motor vehicle.

As shown in FIG. 2, the motor vehicle can be driven inside the protective bag 1 through the opening 9 along the fourth side 5, until reaching the closed end side 3 on the opposite end of the bag. As shown in FIG. 3, once the motor vehicle is placed inside the protective bag 1, the zipper 7 on top layer 1a of the protective bag 1 is closed until it reaches the end at the fourth side 5 of the bag 1, which is now closed and sealed by the Velcro® panels 8a, 8b. (The section of FIG. 3 with "dotted-lines" shows a portion of the vehicle inside the closed bag.)

Once the opening 6 is closed through its heavy-duty zipper 7, the edges 6a, 6b are then aligned and adhered using the removable heavy-duty Velcro® tape on top of the zipper 7. When zipper 7 is in a position where opening 6 is completely closed, the end of zipper 7 is cover with a zipper end cover 7c, to provide the contents of the closed bag 1 with further protection from outside elements.

Figure 4:
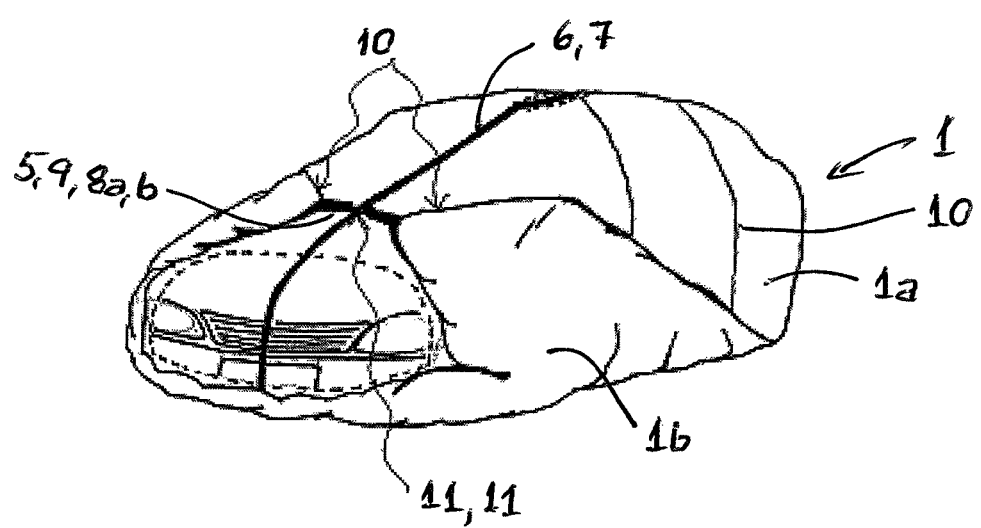
FIG. 4 is a schematic view of an embodiment of the present invention showing a closed protective bag covering the motor vehicle, the protective bag being closed with a zipper, and folded and tightly secured around the vehicle with ropes and hooks.

As shown in FIGS. 2-4, metal hooks 11 are attached to ends of the Velcro® panels 8a, 8b panels extending beyond vertical sides 2 and 4 of the bag 1, As shown in FIG. 4, opposite ends of each of the ropes (straps) 10 are tied or hooked together with hooks above the body of the enclosed vehicle. Further, the fourth side 5 of the bag 1, which is now closed and sealed by the Velcro® panels 8a, 8b, is tightly folded into several folds up from the surface on the closed bag is resting, until it reaches up over sides of the body of the motor vehicle to an upper side of the body of the motor vehicle. After these several folds, the metal hooks 11 on the panel 8a, 8b extending from the vertical sides 2 and 4 of the bag 1 at the open end side 5, are connected to each other, and to at least portions of the rope (strap) 10 closest to the open end side 5 of the bag 1, at positions above the motor vehicle, thereby securely holding and enclosing the motor vehicle in a water tight manner.

Figure 5:
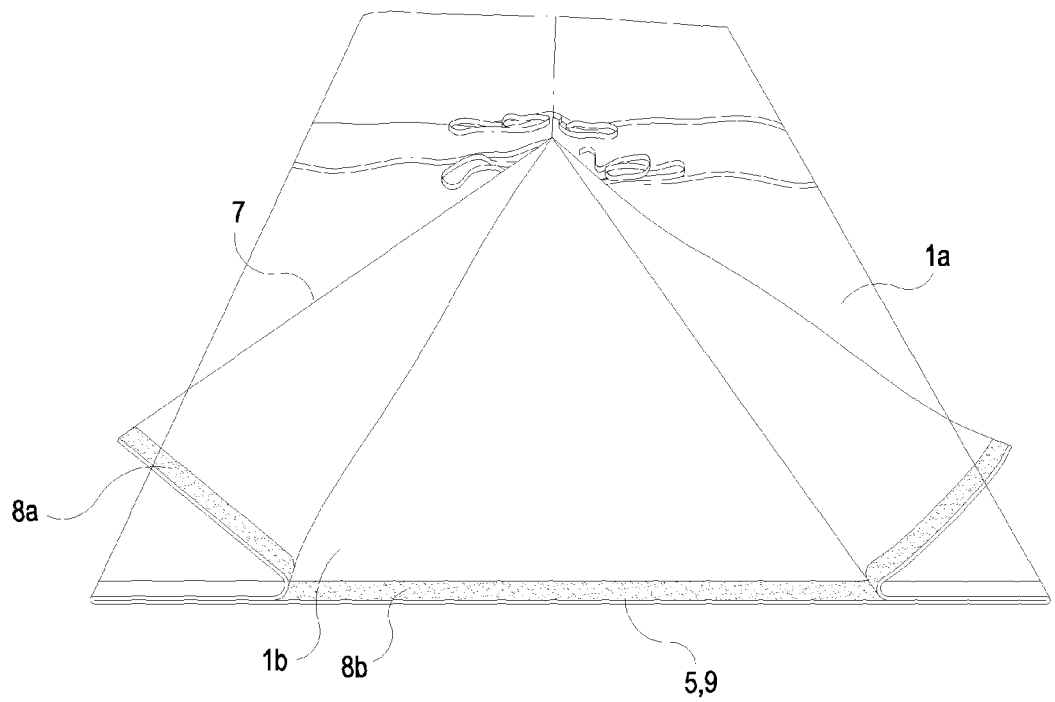
FIG. 5 is an illustration of an embodiment of the present invention showing an open protective bag lying on a planar surface.

FIG. 5 is an illustration of an embodiment a closed protective bag of the present invention lying on a planar surface. FIG. 5 differs from the schematic drawing in FIG. 1 in which opening 6 in top layer 1a of the material is closed by zipper 7, whereas in FIG. 5, the zipper 7 is in an open position.

Figure 6A:
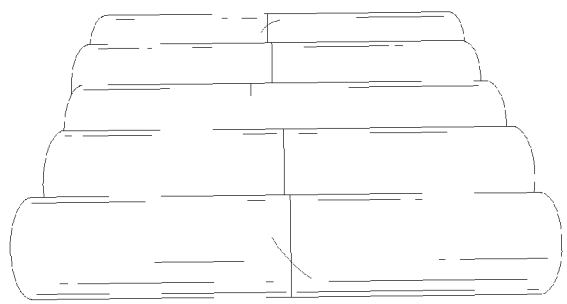
FIGS. 6A-E illustrate various components of materials that are used in the assembly of an embodiment of the protective bag of the present invention.
Figure 6B:
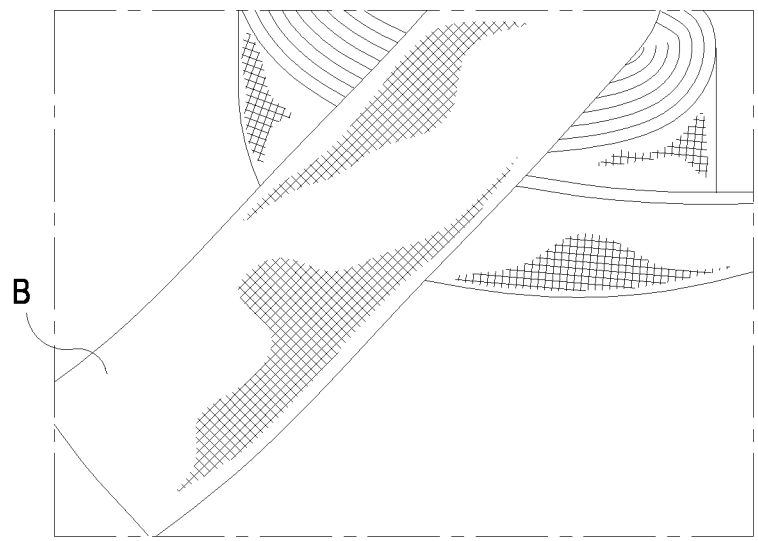

FIGS. 6A-E illustrate components of materials prior to assembly of an embodiment of the protective bag of the present invention. FIG. 6A shows the material of the top and lower layers 1a, 1b of sheeting; and FIG. 6B shows the ropes (straps) 10.

Figure 6C:
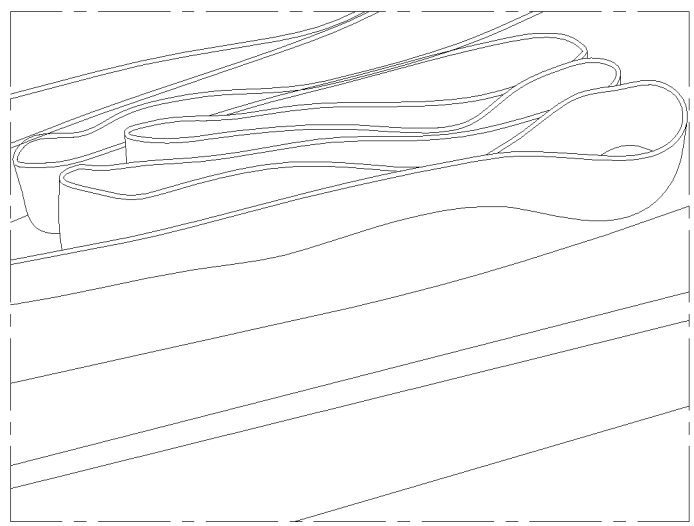

FIG. 6C shows the premade zipper 7 with overlap flaps 7o on opposite sides of the zipper 7 for overlapping side edges 6a, 6b of opening 6.

Figure 6D:
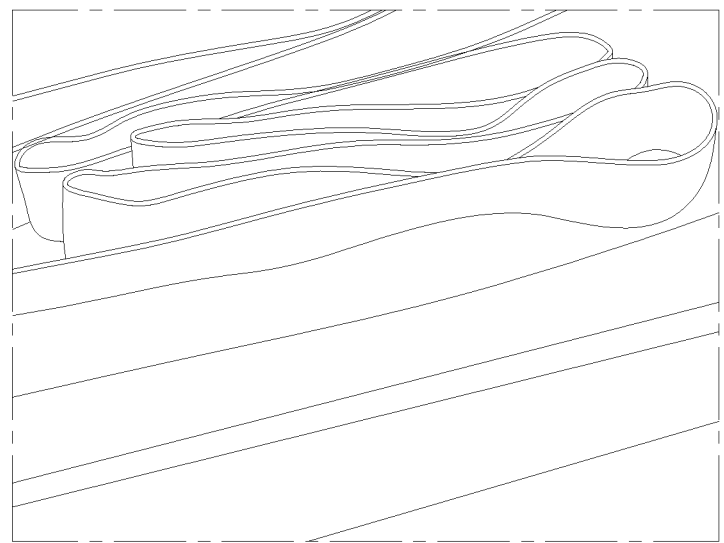

FIG. 6D shows the Velcro® removable adhesive panels 8a, 8b which are sewn to the heavy-duty plastic in the opening 9 found between the upper layer 1a and the lower layer 1b at the open end side 5 of the protective bag 1. The adhesive panels 8a, 8b can completely close the open end side 5 of the bag by sealing upper layer 1a and the lower layer 1b at open end side 5, and alternatively, can be separated from each other to completely the open end side 5 of the bag 1.

Figure 6E:
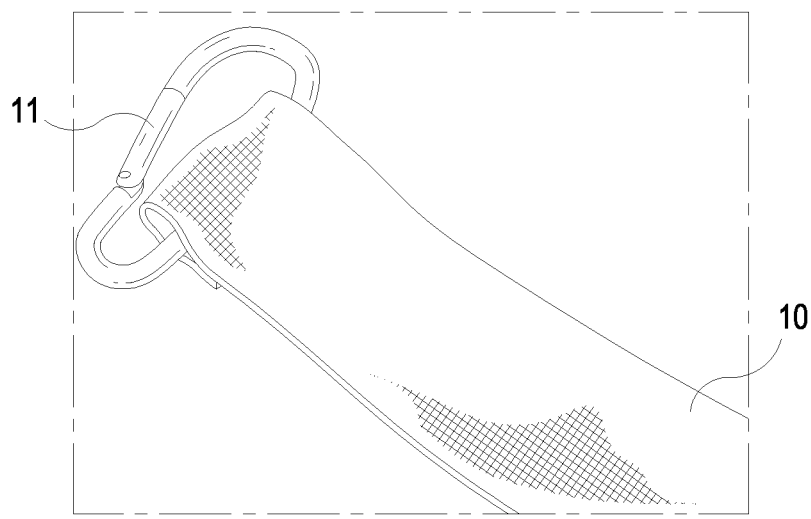

FIG. 6E show the material of ropes (straps) 10 with hooks 11.

FIGS. 7A-E are close-up illustrations of components of materials in an assembled embodiment of the protective bag of the present invention. FIG. 10A is a close-up view of a portion of the Velcro® removable adhesive panels 8a, 8b which are sewn to the heavy-duty plastic in the opening 9.

Figure 7A:
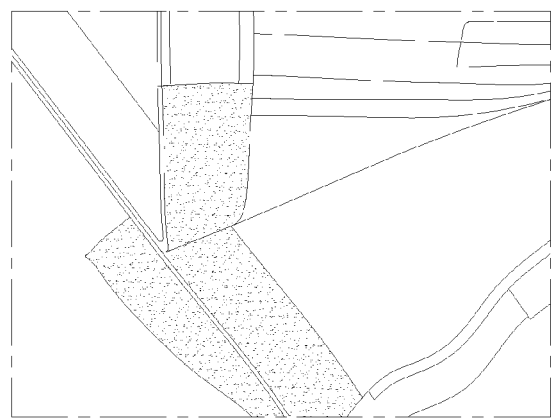
FIGS. 7A-E are close-up illustrations of components of materials in an assembled embodiment of the protective bag of the present invention.
Figure 7B:
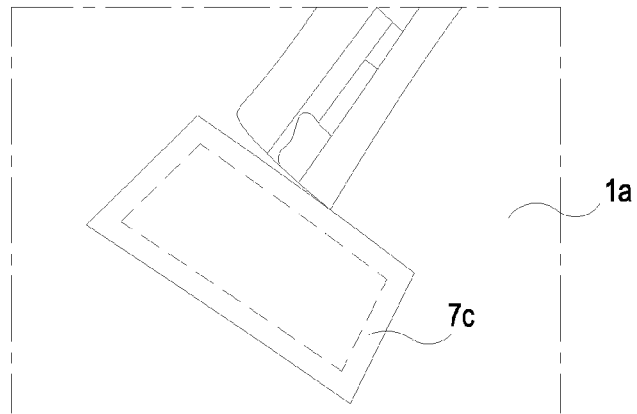

FIG. 7B is a close-up view of the zipper end cover 7c covering the end of zipper 7 providing the contents of the closed bag 1 with further protection from outside elements the when zipper 7 is in a position where opening 6 is completely closed.

Figure 7C:
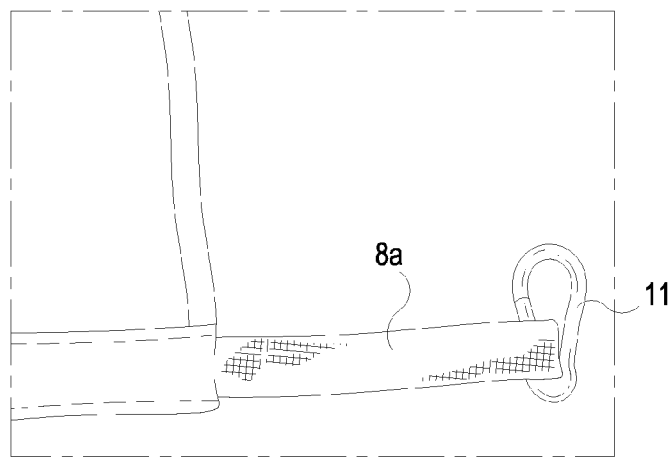

FIG. 7C is a close-up view of the hook 11 at end of each of the adhesive panels 8a.

Figure 7D:
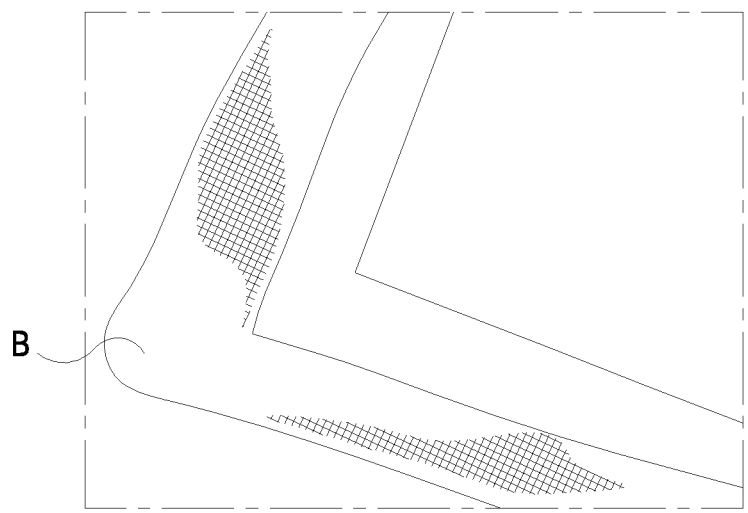
Figure 7E:
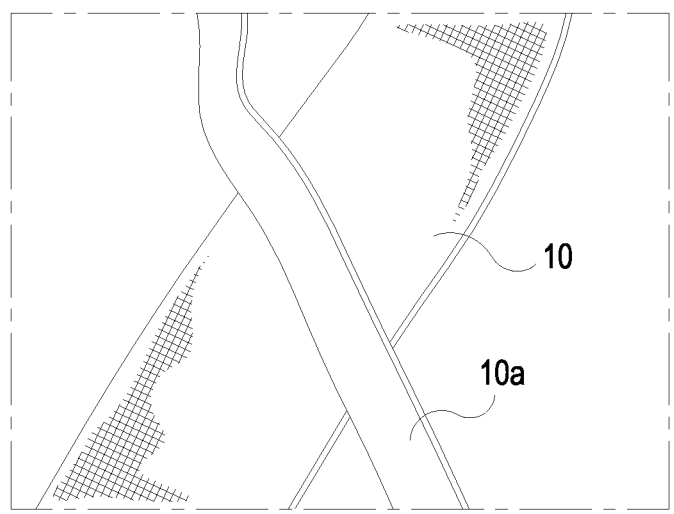

FIG. 7D is a close-up view of a portion of the edge bias B provided along the lengths of the of the bag 1 two vertical sides 2 and 4 and one end side 3 in order to provide extra strength to each of the closed sided of the bag 1; and FIG. 7E is a close-up view of loop 10a made of nylon material sewn in the heavy-duty plastic on each vertical side 2, 4 of the top layer 1a of material.

Figure 8:
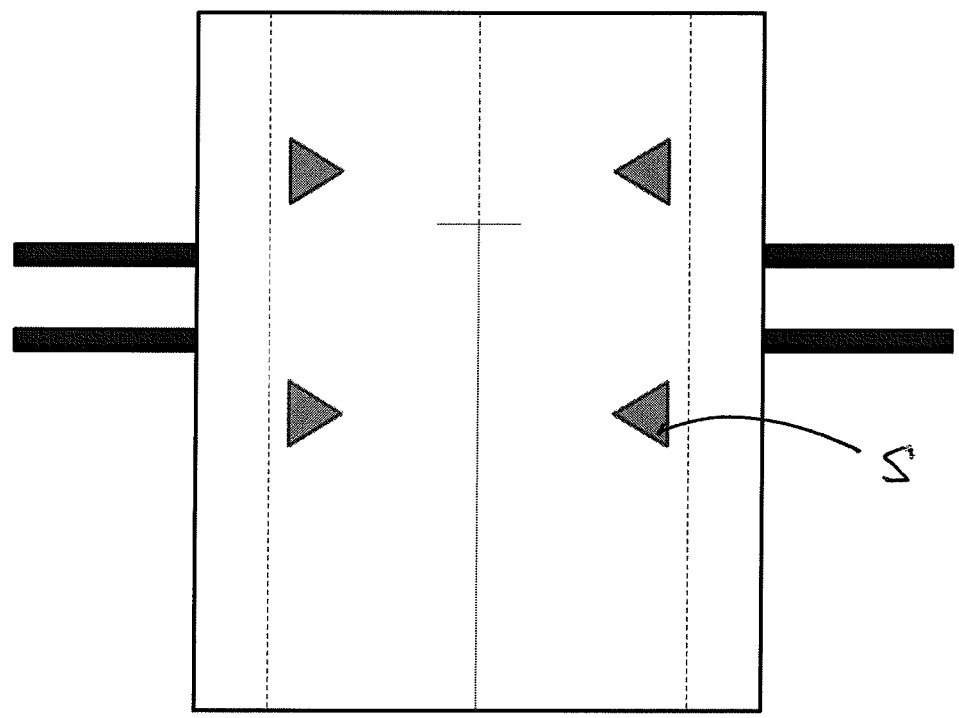
FIG. 8 is a schematic diagram of reflective stickers fixed to the protective bag in an embodiment of the present invention.

FIG. 8 is a schematic view of reflective stickers S fixed to upper layer 1a of the protective bag so that the bag enclosing a motor vehicle can be more easily seen at night.

The invention being thus described, it will be obvious that the same may be varied in many ways. For example, any materials may be used for the sheets of material provided the material is waterproof and is as strong as the heavy-duty plastic is made of polyethylene material with a 350-380 microns (μ) (equivalent to 0.015 in) thickness. Lengths, widths, and thicknesses of the sheets may be cut to sizes corresponding the shape, size, and weight and other characteristics (e.g: sharp edges) of the object to be enclosed. The sheets of material may be rectangular in shape, trapezoidal in shape, or have more than four sides. Other commonly used closing devices may be substituted for zipper 7, the zipper overlaps 7o, and the zipper end cover 7c and for the closable/openable panels 8a, 8b as long as they provide a secure waterproof closure of the bag 1. Such variations are not to be regarded as a departure from the spirit and scope of the invention, and all such modifications as would be obvious to one skilled in the art are intended to be included within the scope of the following claims.

What is claimed is:

1. A water proof bag for protecting objects, comprising:
   a first sheet of waterproof material having at least four sides, including two vertical sides and two horizontal sides;
   a second sheet of waterproof material with a size and shape similar to that of the first sheet and arranged on top of the first sheet so that the sides of the second sheet are aligned directly above the sides of the first sheet;
   a first binding member permanently sealing each pair of the vertical sides of the sheets together, and sealing one pair of the horizontal sides of the first and second sheets together, thereby forming the bag with two permanently closed vertical sides, one permanently closed horizontal side, and the other horizontal side which is openable/closable, thereby forming the waterproof bag as an openable/closable bag,
   a cut formed in the second sheet which starts from a central point in along the openable/closable side and extends parallel to the vertical sides of the bag to a point 60-90% of a distance toward the closed horizontal side of the bag, the cut enabling portions of the second sheet on opposite edges of the cut to be folded away from each other, thus enlarging an opening at the openable/closable side of the bag, so that the objects to be protected are able to be easily entered into and positioned inside the bag;
   an attaching/detaching member for opening and closing the opposite edges of the cut in the second sheet, and
   a second binding member for opening and closing the opening between the first sheet and the second sheet at the openable/closable side of the bag,
   wherein when the opposite edges of the cut in the second sheet are closed with the attaching/detaching member, and the opening between the first sheet and the second sheet at the openable/closable side of the bag are closed by the second binding member, the waterproof bag is closed and impervious to entry of water, and alternatively,
   when the opposite edges of the cut in the second sheet are separated by the attaching/detaching member, and the opening between the first sheet and the second sheet at the openable/closable side of the bag are opened by separating upper and lower panels of the second binding member, the waterproof bag is open, thereby enabling the objects in the bag to be removed.

2. The water proof bag for protecting objects according to claim 1, wherein the bag is large enough to enclose and protect an automobile.

3. The water proof bag for protecting objects according to claim 1, wherein the bag is rectangular in shape, and the vertical side are 6.0-10.0 meters in length, and the horizontal sides are 3.5-6.0 meters in length.

4. The water proof bag for protecting objects according to claim 1, wherein the first and second sheets are made of heavy-duty plastic each having a thickness of 350 microns.

5. The water proof bag for protecting objects according to claim 1, wherein the first and second sheets are made of waterproof material 150-350 microns (μ) thick.

6. The water proof bag for protecting objects according to claim 1, wherein the first binding member includes:
   a heat seal which permanently seals together each pair of the vertical sides of the sheets, and permanently seals together the one pair of the two sheets at the closed horizontal side of the bag, and
   a reinforcing nylon strip is sewn along the vertical sides of the sheets together and along the horizontal sheets at the closed horizontal side of the bag.

7. The water proof bag for protecting objects according to claim 6, further comprising:
   two or more straps extending across a top of the second sheet in a direction substantially parallel to the horizontal sides of the bag in positions closer to the closed horizontal side of the bag than to the openable/closable horizontal side of the bag,
   wherein each of the straps is secured by loops in the reinforcing nylon strip provided on opposite vertical sides of the bag, and has a length which extends beyond each of the opposite vertical sides of the bag.

8. The water proof bag for protecting objects according to claim 7, wherein the second binding member is a pair of heavy-duty waterproof openable/closable panels for opening and closing the openable/closable horizontal side of the bag.

9. The water proof bag for protecting objects according to claim 1, wherein a zipper for opening and closing the opposite edges of the cut in the second sheet is provided with 10 cm wide overlap covering the opposite edges of the cut, in order to repel water from entering through the cut when the zipper has closed the opposite edges of the cut.

10. The water proof bag for protecting objects according to claim 1, wherein the second binding member is a pair of heavy-duty waterproof openable/closable panels for opening and closing the openable/closable horizontal side of the bag.

11. The water proof bag for protecting objects according to claim 10, further comprising:
a heavy-duty metal hook provided at each end of the second binding member.

12. The water proof bag for protecting objects according to claim 1, wherein the bag is reusable.

13. A water proof bag for protecting objects comprising:
a first sheet of waterproof material having at least four sides, including two vertical sides and two horizontal sides;
a second sheet of waterproof material with a size and shape similar to that of the first sheet and arranged on top of the first sheet so that the sides of the second sheet are aligned directly above the sides of the first sheet;
a first binding member permanently sealing each pair of the vertical sides of the sheets together, and sealing one pair of the horizontal sides of the first and second sheets together, thereby forming the bag with two permanently closed vertical sides, one permanently closed horizontal side, and the other horizontal side which is openable/closable, thereby forming the waterproof bag as an openable/closable bag;
a cut formed in the second sheet which starts from a central point in along the openable/closable side and extends parallel to the vertical sides of the bag to a point 60-90% of a distance toward the closed horizontal side of the bag, the cut enabling portions of the second sheet on opposite edges of the cut to be folded away from each other, thus enlarging an opening at the openable/closable horizontal side of the bag so that the objects to be protected are able to be easily entered into and positioned inside the bag;
an attaching/detaching member for opening and closing the opposite edges of the cut in the second sheet, and
a second binding member for opening and closing the opening between the first sheet and the second sheet at the openable/closable side of the bag,
wherein when the opposite edges of the cut in the second sheet are closed with the attaching/detaching member, and the opening between the first sheet and the second sheet at the openable/closable side of the bag are closed by the second binding member, the waterproof bag is closed and impervious to entry of water, and alternatively,
when the opposite edges of the cut in the second sheet are separated by the attaching/detaching member, and the opening between the first sheet and the second sheet at the openable/closable side of the bag are opened by separating upper and lower panels of the second binding member, the waterproof bag is open, thereby enabling the objects in the bag to be removed, and
further comprising:
two or more straps extending across a top of the second sheet in a direction substantially parallel to the horizontal sides of the bag in positions closer to the closed horizontal side of the bag than to the openable/closable horizontal side of the bag,
wherein each of the straps is secured by loops in the reinforcing nylon strip provided on opposite vertical sides of the bag, and has a length which extends beyond each of the opposite vertical sides of the bag, and
wherein when the object to be protected is in the waterproof bag, and the bag is closed and the two sheets of the bag are folded against the object in the bag, metal hooks provided on the ends of the second binding member are connected to each other above the object in the bag, and the straps extending across a top of the second sheet are connected to each other, the bag is tightly secured in a waterproof manner around the object inside.

14. The water proof bag for protecting objects according to claim 13, further comprising:
a heavy-duty metal hook provided at each end of the second binding member.

15. A water proof bag for protecting objects, comprising:
a first sheet of waterproof material having at least four sides, including two vertical sides and two horizontal sides;
a second sheet of waterproof material with a size and shape similar to that of the first sheet and arranged on top of the first sheet so that sides of the second sheet are aligned directly above the sides of the first sheet;
a first binding member permanently sealing each pair of the vertical sides of the sheets together, and sealing one pair of the horizontal sides the first and second sheets together, thereby forming the bag with two permanently closed vertical sides, one permanently closed horizontal side, and the other horizontal side which is openable/closable, thereby forming the waterproof bag as an openable/closable bag;
a cut formed in the second sheet which starts from a central point in along the openable/closable side and extends parallel to the vertical sides of the bag to a point 60-90% of a distance toward the closed horizontal side of the bag, the cut enabling first and second portions of the second sheet arranged respectively on opposite edges of the cut to be folded away from each other, thus enlarging an opening at the openable/closable side of the bag so that the objects to be protected are able to be easily entered into and positioned inside the bag;
an attaching/detaching member for opening and closing the opposite edges of the cut in the second sheet, and
a second binding member for opening and closing the opening between the first sheet and the second sheet at the openable/closable side of the bag,
wherein when the opposite edges of the cut in the second sheet are closed with the attaching/detaching member, and the opening between the first sheet and the second sheet at the openable/closable side of the bag are closed by the second binding member, the waterproof bag is closed and impervious to entry of water, and alternatively,
when the opposite edges of the cut in the second sheet are separated by the attaching/detaching member, and the opening between the first sheet and the second sheet at the openable/closable side of the bag are opened by separating upper and lower panels of the second binding member, the waterproof bag is open, thereby enabling the objects in the bag to be removed,
wherein when the cut in the second sheet is open, each of the first and second portions of the second sheet arranged respectively on the opposite edges of the cut is capable of being folded away from the other of the first and second portions of the second sheet, while the other of the first and second portions of the second sheet remains bound to the first sheet.

* * * * *